US008875183B2

US 8,875,183 B2
Oct. 28, 2014

(12) United States Patent
Collet et al.

(10) Patent No.: US 8,875,183 B2
(45) Date of Patent: Oct. 28, 2014

(54) INTELLIGENT TV MOSAIC FOR IPTV

(75) Inventors: Jean-luc Collet, La Gaude (FR); Francois-Xavier Drouet, La Gaude (FR); Corinne Suzanne Fresko, London (GB); Fabien Patrick Lanne, Valbonne (FR)

(73) Assignee: International Business Machines Corporation, Armonk, NY (US)

( * ) Notice: Subject to any disclaimer, the term of this patent is extended or adjusted under 35 U.S.C. 154(b) by 949 days.

(21) Appl. No.: 12/331,654

(22) Filed: Dec. 10, 2008

(65) Prior Publication Data
US 2010/0115554 A1 May 6, 2010

(30) Foreign Application Priority Data

Oct. 31, 2008 (EP) .................................... 08305760

(51) Int. Cl.
| | |
|---|---|
| *H04N 7/10* | (2006.01) |
| *H04N 21/45* | (2011.01) |
| *H04N 21/439* | (2011.01) |
| *H04N 5/445* | (2011.01) |
| *H04N 21/44* | (2011.01) |
| *H04N 21/431* | (2011.01) |
| *H04N 21/462* | (2011.01) |
| *H04N 21/442* | (2011.01) |
| *H04N 21/61* | (2011.01) |

(52) U.S. Cl.
CPC ....... *H04N 5/44543* (2013.01); *H04N 21/4532* (2013.01); *H04N 21/6175* (2013.01); *H04N 21/4394* (2013.01); *H04N 21/6125* (2013.01); *H04N 21/44008* (2013.01); *H04N 21/4314* (2013.01); *H04N 21/4622* (2013.01); *H04N 21/44222* (2013.01)
USPC ......................................................... 725/41

(58) Field of Classification Search
CPC .......................... H04N 5/44543; H04N 21/482
USPC ......................................................... 725/41, 45
See application file for complete search history.

(56) References Cited

U.S. PATENT DOCUMENTS

| 7,055,166 B1 | 5/2006 | Logan et al. | |
|---|---|---|---|
| 7,055,168 B1 * | 5/2006 | Errico et al. .................... | 725/46 |

(Continued)

FOREIGN PATENT DOCUMENTS

| KR | 1020060022536 | * | 3/2006 |
|---|---|---|---|
| WO | WO 2004062945 A2 | * | 7/2004 |

OTHER PUBLICATIONS

ETSI TS 102 592, DVB; IPDC over DVB-H: ESG Implementation Guidelines, v1.1.1, Oct. 2007, p. 1-151.*

(Continued)

*Primary Examiner* — Nathan Flynn
*Assistant Examiner* — Alfonso Castro
(74) *Attorney, Agent, or Firm* — Scully, Scott, Murphy & Presser, P.C.; Jean M. Berkley, Esq.

(57) ABSTRACT

A method of building an interactive display related to TV programs in an internet protocol television (IPTV) environment includes parsing a plurality of TV programs provided in an IPTV environment for display to a user. The step of parsing includes capturing an image in each TV program, identifying video content in each captured image, interpreting the video content, capturing audio data, identifying an audio content in each captured audio data, and interpreting the audio content for each captured audio data. The method further includes the steps of identifying a selected TV program by the user; determining a correlation level between the interpreted video and audio content of the selected TV program and the interpreted video and audio content of each of the other TV programs; determining TV programs other than the selected TV program; and building and presenting a mosaic display on a TV display including the selected TV program.

21 Claims, 5 Drawing Sheets

(56) References Cited

U.S. PATENT DOCUMENTS

| | | |
|---|---|---|
| 2006/0122984 A1* | 6/2006 | Byers et al. ........................ 707/3 |
| 2007/0011702 A1 | 1/2007 | Vaysman |
| 2007/0220546 A1* | 9/2007 | Shanks et al. .................. 725/38 |
| 2008/0033992 A1* | 2/2008 | Sloo et al. .................. 707/104.1 |
| 2009/0100462 A1* | 4/2009 | Park et al. ........................ 725/38 |
| 2011/0202960 A1* | 8/2011 | Vaysman et al. ................ 725/41 |

OTHER PUBLICATIONS

ETSI TS 102 471, DVB; IP Datacast over DVB-H: ESG, v1.2.1, Nov. 2006, p. 1-81.*

Byunghee Jung, Automated Content-Based Video Retrieval System using MPEG-7 Metadata, Korean Broadcasting System, Sep./Oct. 2004, p. 12-17.*

J. Delgado et al., An Architecture for TV Content Distributed Search and Retrieval Using the MPEG Query Format (MPQF), Feb. 2008, Ambi-sys, p. 1-8.*

L. Gagnon et al., MPEG-7 audio-vidual indexing test-bed for video retrieval, Jan. 2004, SPIE Internet Imaging V, p. 1-11.*

Delgado, J.; Llorente, S.; Peig, E.; Carreras, A, A Multimedia Content Interchange Framework for TV Producers Automated Production of Cross Media Content for Multi-Channel Distribution, 2006.

AXMEDIS '06. Second International Conference on (0-7695-2625-X), 2006. p. 206-213.*

Smith, John R., The MPEG Query Format: Unifying Access to Multimedia Retrieval Systems, Oct. 2008, IEEE Computer Society, pp. 82-95.*

Harmonic Inc./Product Catalog, "ProStream 8000 Digital Mosaic Solution", www.harmonicinc.com//view_product.cfm.

"Gotuit Personalizes Content on Demand", www.broadbandgear.net/archives/special/email-whoswho-013006.html.

Active Video Distribution Network (AVDN), ICTV(TM) to Demonstrate Industry's First Personalize Video Mosaic Solution at CableLabs(R) Winter Conference, www.lexdon.com/article/ICTV(TM)_to_demonstrate_industrys_first/35222.html.

ICTV AVDN, Mixing Broadband Video with TV, www.ictv.com/avdn/avdn.htm.

"Interactive Digital Video Mosaic System", www.httv.fr/dl/PS/PrimeMosaic.pdf.

Byunghee Jung, Myunghwan Ha, Heejung Kim, Kyeongsoo Kim, Automated content-based video retrieval system using MPEG-7 metadata, ABU Technical Review, n214, Sep./Oct. 2004, p. 12-17.

Wensheng Zhou, et al., "On-line scene change detection of multicast (MBone) video", Proceedings of the SPIE—The International Society for Optical Engineering, vol. 3527, 1998, pp. 271-282.

* cited by examiner

INTELLIGENT TV MOSAIC FOR IPTV

CROSS REFERENCE TO RELATED APPLICATION

This application is related to commonly-owned, co-pending European Patent Application No. EP08305760 filed on Oct. 31, 2008, the contents and disclosure of which is expressly incorporated by reference in its entirety.

FIELD OF THE INVENTION

The present invention relates to a method, and system for implementing said method, for creating a dynamic TV display, and more specifically, a dynamic and personalized TV display in an internet protocol television (IPTV) environment.

BACKGROUND OF THE INVENTION

Television (TV) broadcasts are currently designed to deliver a consistent and static product for all users. Typically, a user watching television selects from viewing a multiplicity of prescheduled broadcasts. One shortcoming of current TV broadcasts is that there is little control by a user pertaining to how channels are presented. A further disadvantage of current TV broadcasts is that there is no relation between the presentation of channels and a users channel preference.

The term IPTV widely used in this document stand for Internet Protocol Television and is an umbrella term describing television (TV) and video delivered using internet technology instead of normal linear radio frequency (RF) broadcast. An IPTV solution is based on three groups of components as described below. Referring to FIG. 1 an illustrative IPTV architecture 10 includes a triple play environment is one in which a plurality of services is provided to a user over an Internet Protocol (IP) transmission medium or IP network or backbone 14. The plurality of services provided to an end user 18 over such a service includes, but are not limited to, TV live, Video, Video on demand (VOD), mail, games, voice over IP (VoIP), notification, chat, video conferencing, etc. The end user 18 may have a personal computer (PC) 19b, a set-top box 19c for a TV set 19e in their home 19d, all connected to a modem 19a for accessing the IP backbone 14 such as the Internet.

The head end component 22 includes a content provider and specific equipment needed to transmit and receive the digital assets (for example, satellite receiver 24, and encoders 26). Such equipment ensures the transport of digital assets onto the IP network 14. The head end component 22 provides a platform for the live content available and can also manage the dynamic information sent by a broadcaster 32 for an EPG (Electronic Programming Guide). Thus, the broadcaster 32 is the main link between the head end component 22 and a middleware component 42.

The middleware component 42 includes infrastructure ensuring the delivery of the digital assets to the end users, including, for example, IP network infrastructure, portal servers, data storage, and video on demand servers. The customer premises as the end user may include equipment or components installed at a user's home for consuming of the digital assets by the end users. Such devices are heterogeneous as the list of services provided to the user are numerous, and may include, for example, phones, personal digital assistant (PDA), set-top boxes, personal computers (PCs), digital subscriber line (DSL) modems, and/or wireless access point.

The IPTV architecture 10 shown in FIG. 1 provides every viewer with a personal relationship with a broadcaster through a transactional request/response mechanism, rather than picking up a broadcast sent to everyone. IPTV networks generally are based on one of two models, a closed model using a private IP network (local area network (LAN) or DSL, for example, cable TV), and an open model, using the public internet. Typically, when a user subscribes to an IPTV offer they receive a modem and a box which sits on or near the TV 19e, or a set-top box 19c. The IPTV service provides, for example, mail, liveTV, a program guide, personal video recording and video on demand provided by the service provider (for example, Verizon™, Telefonica®, France Telecom®). Live TV channels in an IPTV environment are transmitted to consumer set-top boxes 19c using IP multicasting technology. Each channel uses a different multicast group and the internet group management protocol (IGMP) protocol is used to leave or join a given group based on the TV channel selected.

IP multicast provides a method for one-to-many delivery of information packets (i.e., formatted block of data). Unicast is sending information packets to a single destination. Comparatively, broadcasting refers to transmitting a packet that will be received by every device on a network, limited to a broadcast domain. To achieve one-to-many delivery using IP unicast traffic, each information packet or datagram (i.e., from a service which does not notify the user if delivery fails) is sent to all nodes in a group, and thus is sent multiple times. Thus, a single datagram is sent, but all nodes process it, even those that are not interested. Broadcast delivery service is unsuitable for internetworks, as routers are designed to prevent the spread of broadcast traffic. With IP multicast, a single datagram is sent and forwarded across routers only to the network segments containing nodes that are interested in receiving it.

IP multicast traffic may be used for audio and video teleconferencing, distance learning, and data transfer to a large number of hosts. Mosaic displayed channels are specific TV channels gathered into a matrix, or mosaic display, of X by Z thumbnails of live channels available on the network on a single video channel. A user may then navigate through each thumbnail in the mosaic display to select a channel for viewing. The specific channels are encoded at the head end part of the IPTV infrastructure using dedicated hardware components mixing X by Z channels into a single video stream with X by Z audio channels. On existing digital video broadcasting (DVB) distribution channels (DVB-T, DVB-S, etc. . . . ) all the channels presented in the mosaic are statics, that is, the list of channels per mosaic are based on the head end configuration. The mosaic may be built by the head end component 22 which collects all the TV channels. The head end component 22 reencodes the channels in one stream with a smaller format. Thus, the user typically enters a selection provided on the TV screen allowing scrolling through pages of mosaic TV channels and allows a selection of a channel. One disadvantage of a static mosaic is that the user does not have control of the mosaic and/or is unable to selectively change the mosaic. Another disadvantage of the static mosaic is the cumbersome manner that a user has to scroll though many pages of channel. Further, the channel description must include textual description as the image may not adequately indicate the channel content.

It would therefore be desirable to provide a method, and system implementing said method, for providing a TV display which reflects the user's preferences. It would further be desirable for the display to dynamically reflect the user's preferences in TV viewing.

SUMMARY OF THE INVENTION

In an aspect of the invention, a method of building an interactive display related to TV programs in an internet protocol television (IPTV) environment comprises: parsing a plurality of TV programs provided in an IPTV environment for display to a user, wherein the step of parsing includes: capturing an image in each TV program; identifying video content in each captured image wherein the video content comprises at least one object; interpreting the video content for each captured image; capturing audio data for each of the TV programs;
identifying an audio content in each captured audio data wherein the audio content comprises text and/or sound; and interpreting the audio content for each captured audio data; identifying a selected TV program by the user; determining a correlation level using predefined rules between the interpreted video and audio content of the selected TV program and the interpreted video and audio content of each of the other TV programs; determining TV programs other than the selected TV program using the correlation level of the TV programs; and building and presenting a mosaic display on a TV display with the selected TV program and the plurality of other TV programs.

In a related aspect, the steps may be repeated and/or the method may further includes a first step of: requesting the subsequent steps by a user. In another related aspect, the display may be a mosaic having a plurality of interactive areas. The method may further include: selecting the interactive areas using a head end device which provides a plurality of TV programs in an IPTV environment.

In another aspect of the invention, a system for building an interactive display related to TV programs in an internet protocol television (IPTV) environment includes a computer having a computer program stored on a computer readable medium for parsing a plurality of TV programs provided in an IPTV environment for display to a user. A metadata aggregator captures an image in each TV program. The meta data aggregator: identifies video content in each captured image wherein the video content comprises at least one object, interprets the video content for each captured image; capturing audio data for each of the TV programs, identifies an audio content in each captured audio data wherein the audio content comprises text and/or sound, and interprets the audio content for each captured audio data. The computer program further identifies a selected TV program by the user, and determines a correlation level using predefined rules between the interpreted video and audio content of the selected TV program and the interpreted video and audio content of each of the other TV programs; determining TV programs other than the selected TV program using the correlation level of the TV programs. A mosaic builder electrically communicates with a TV of the user and the metadata aggregator. A TV display of the user's TV presents a mosaic display using the mosaic builder. The mosaic display includes the selected TV program and the plurality of other TV programs.

In a related aspect, the display is a mosaic having a plurality of interactive areas. The system may further include: a head end device providing selection of the interactive areas which provides a plurality of TV programs in an IPTV environment. The metadata may be gathered from a TV channel provider using an electronic program guide. The system may also include: a thumbnail generator for decoding several IPTV video streams simultaneously. Further, metadata for non live TV channels may be generated from video demand catalogs and/or other video server providers and used by the metadata aggregator.

In another aspect of the invention, a computer program product comprises a computer readable medium having recorded thereon a computer program for enabling a processor in a computer system to build an interactive display related to TV programs in an internet protocol television environment, the computer program performs the steps of: parsing a plurality of TV programs provided in an IPTV environment for display to a user, wherein the step of parsing includes: capturing an image in each TV program; identifying video content in each captured image wherein the video content comprises at least one object; interpreting the video content for each captured image; capturing audio data for each of the TV programs; identifying an audio content in each captured audio data wherein the audio content comprises text and/or sound; and interpreting the audio content for each captured audio data; identifying a selected TV program by the user; determining a correlation level using predefined rules between the interpreted video and audio content of the selected TV program and the interpreted video and audio content of each of the other TV programs; determining TV programs other than the selected TV program using the correlation level of the TV programs; and building and presenting a mosaic display on a TV display with the selected TV program and the plurality of other TV programs.

In a related aspect, the steps may be repeated and/or the program further includes a first step of: requesting the subsequent steps by a user. Further, the display may be a mosaic having a plurality of interactive areas. The computer program product further including the step of: selecting the interactive areas using a head end device which provides a plurality of TV programs in an IPTV environment.

BRIEF DESCRIPTION OF THE DRAWINGS

These and other objects, features and advantages of the present invention will become apparent from the following detailed description of illustrative embodiments thereof which is to be read in connection with the accompanying drawings, in which.

DETAILED DESCRIPTION OF THE INVENTION

Figure 2:
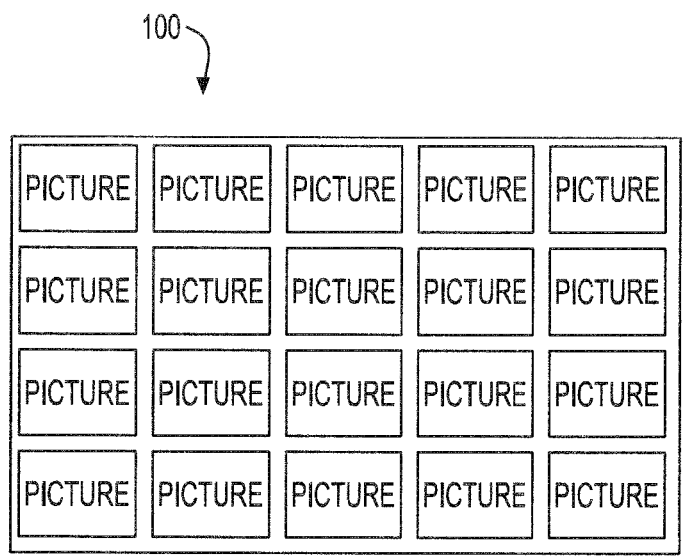
FIG. 2 is a front elevational view of a mosaic TV display.

The system and method of the present invention creates meta data (i.e., information about data) on TV channels received by a user on their TV. The audio and the video streams are parsed to create a database of the meta data. The meta data may be defined according to the audio part of the TV channels or based on objects included in the TV channels. The most pertinent TV channels are proposed to the user according to what the user is watching. In one embodiment of the present invention, a mosaic format as shown in FIG. 2 is presented to the user. The mosaic display dynamically presents the most pertinent TV channels based on their current watching and interests. In parallel, the TV channels proposed are recorded on a network personal video recorder (NPVR).

Thus, the system of the present invention presents the user with channel selections, for example, on the TV screen which allows the user to select a channel by clicking on the TV screen, e.g., an interactive link or thumbnail. Thereby, the user's TV will go to the channel selected.

Figure 3:
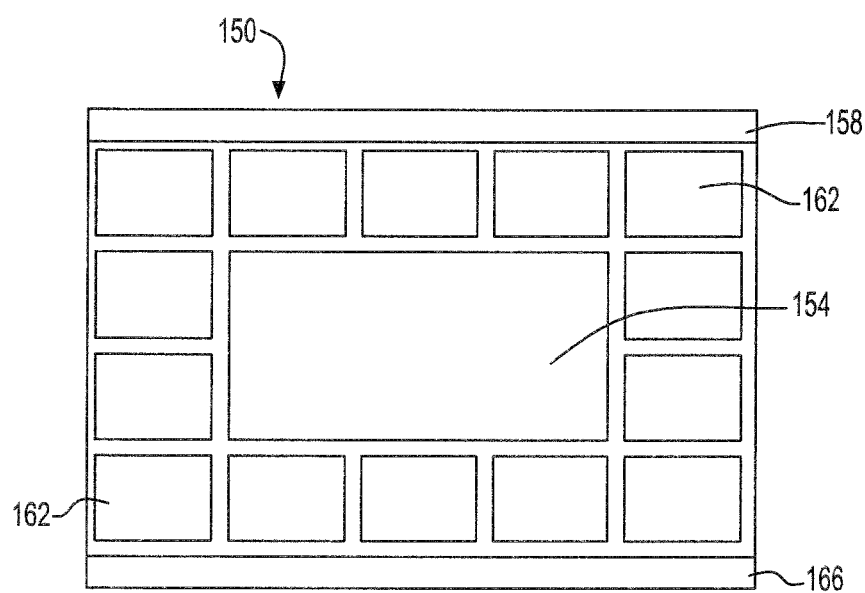
FIG. 3 is a front elevational view of a mosaic TV display according to one embodiment of the invention.

Referring to FIG. 3, another embodiment of the system of the present invention includes a dynamic mosaic presented on a graphical user interface (GUI) 150 of a video channel composed of one main TV channel 154 and related TV channels 162 based on user preferences. The dynamic mosaic can be used like a video browser where a current video channel is referenced as the main video channel 154 in the center of the mosaic and all the others channels aggregated on the mosaic are related to one or more attributes of the main TV video channel. When a user navigates to another TV video channel other than the main video channel 154, the mosaic 150 is dynamically rebuilt based on the new main TV video channel 154 attributes and metadata together with a user profile.

As shown on FIG. 3, the mosaic GUI 150 includes the main video channel 154 in the center of the mosaic 150 which is currently the preferred video channel. An area 158 of the mosaic 150 includes a list of categories of TV channels available through the mosaic application 294 stored in a middleware component 290 on a computer readable medium 292 and communicating with a processor 296 (shown in FIG. 4) in a computer system 289. For example, TV channels available may include movies, shows, sports, and soap operas. Area 158 may be a hierarchical organization with categories and sub-categories, for example, sports, including tennis, soccer, and skiing. Each category and sub-category may have a new mosaic generated based on the user selection. A plurality of TV channels 162 are related to the main TV channel 100 and positioned around a perimeter of the main TV channel 100. Keywords are determined from attributes of the main channel 100, to generate a keyword list of related TV channels which is displayed on the mosaic application 292 based the keywords pertinence to the main TC channel 100. A textual information area 166 of the mosaic 150 provides textual information related to the main TV channel 154, for example, program name, timeframe, summary, and the like.

Figure 4:
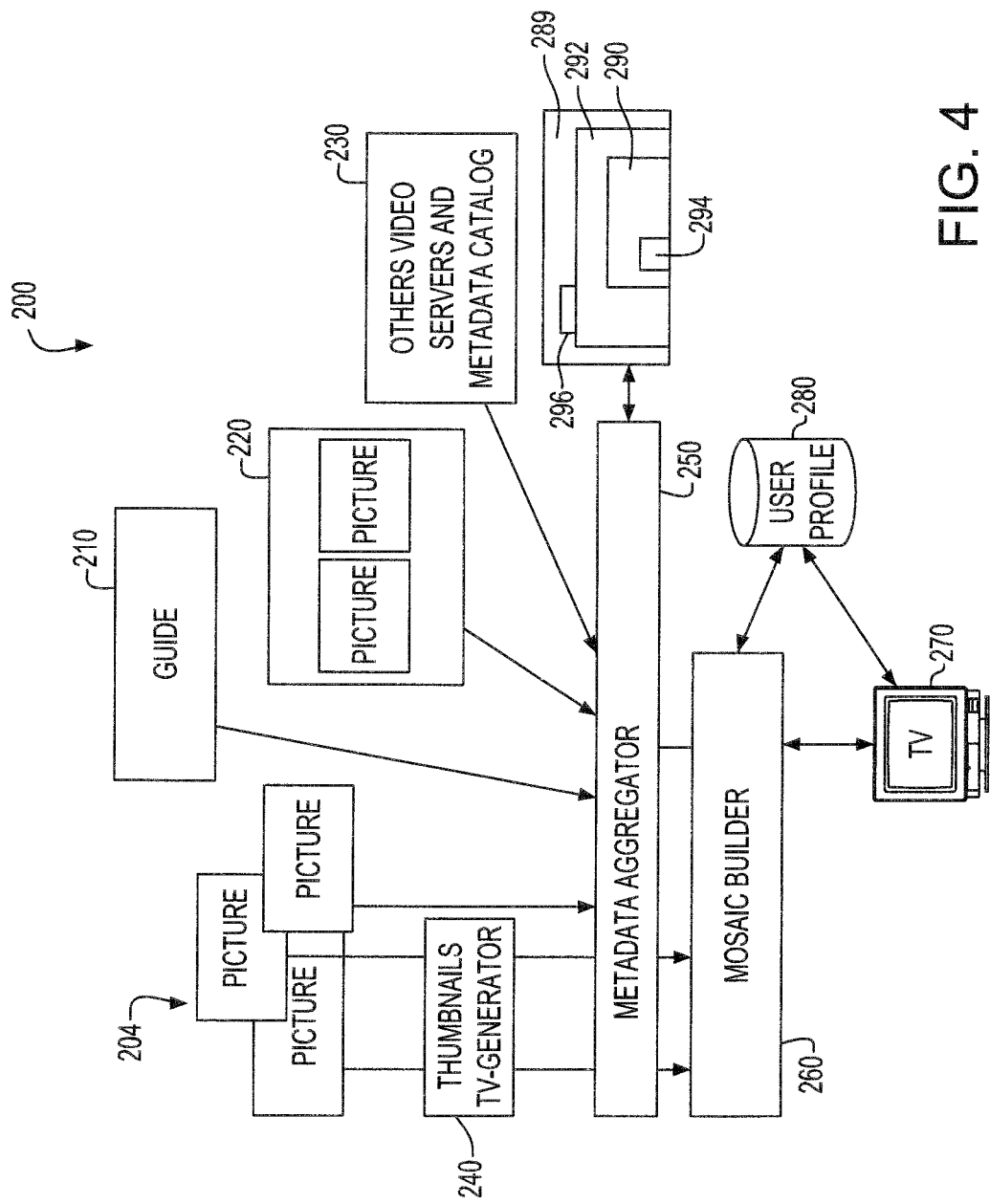
FIG. 4 is a block diagram of a system according to one embodiment of the invention for providing the mosaic shown in FIG. 3.

Referring to FIG. 4, system architecture 200 according to an embodiment of the invention includes components to implement the dynamic mosaic application 294 of the present invention. A metadata aggregator 250 gathers each TV channel and a list of related materials composed of other TV channels with relevant similarity with the current one and ordered by importance. The list of related TV channels can be made of other live feeds available on the IPTV infrastructure, but can also be gathered from other sources like video on demand catalogs, network personal video recording (NPVR) providers or any other accessible video server like internet video provider. The metadata for live TV channels is retrieved, in one instance, by using metadata embedded inside the live feeds, where for each channel some basic information can be retrieved, for example, title, genre, summary, timeframe. Alternatively, metadata can be gathered from a professional TV channel provider using an electronic program guide EPG 210 which provides additional information on current and forecast programs including pictures, resume, actors, etc. Additional mechanism for generating metadata information include audio recognition onto live feeds, generating dynamic keywords, and image recognition on broadcasted video to generate metadata.

Metadata for non live TV channels is generated from video on demand catalogs 220 or other video server provider 230 accessible from the same network, for example, internet video service providers. For example, if one live channel is broadcasting an interview of a celebrity, the user can be interested in watching a movie where the celebrity is part of the cast, or seeing the celebrity on a video on demand provider such as YouTube®.

Another component of the system architecture 200 is a mosaic builder 260 which links the metadata aggregator 250 and the user premises equipment, e.g., set top box 270. For example, when a user requests the mosaic application 292 while watching a TV channel or a movie using a middleware IPTV application a request is sent to the mosaic builder 260. The request is retrieved from the metadata aggregator 250 and all the related video (live & non live) which is similar with the current watched program is displayed on the user TV screen, for example, using the screen template 150 shown on FIG. 3.

The mosaic builder 260 provides the mosaic interface 150 (FIG. 3). The mosaic builder 260 includes generating the mosaic using parameters including, for example, a user identification (ID), a current channel ID, and generating categories, or sub-categories. The user ID parameter identifies each end user and allows the mosaic builder 260 to retrieve the associated user profile template & preferences. The current channel ID identifies the main video channel 154 in FIG. 3 and allows the mosaic builder 260 to retrieve related video from the metadata aggregator 250. A category tree of a selected menu item may include categories, and subcategories.

An example of the mosaic builder's 260 steps described above for providing the mosaic interface 150 includes a GetMosaic method including the following steps:

1. GetMosaic (for example, user ID, current channel ID, category, sub-category);
2. Identify user ID parameter for each end user and allow the mosaic builder to retrieve the associated user profile template & preferences;
3. Identify the current channel ID identify the main video channel 154 (FIG. 3) and allow the mosaic builder to retrieve related video to it; and
4. Determine category, subcategory, etc., in the category tree of the selected menu item, if any, (in this case the current channel ID is set to null) otherwise this parameter is not used.

A component user profile 280 is used by the mosaic builder 260, in two ways, firstly, if there is not enough related video to fulfill the mosaic video elements 162, then general user preferences are used to complement the mosaic with the preferred user channels, at least one per category (for example, sport, music, etc.).

To build the mosaic main menu 158 (FIG. 3) with the user template preferences model, the model can be implemented as an XML document or file, stored in the computer readable medium 290, describing the entire user preferred categories and subcategories tree description. An embodiment of user template preferences (XML tags), including a mosaic XML main menu data representation, includes:

```
<Main categories>
    <Category name="News" priority=1 />
    <Category name="Movie" priority=2 />
        <sub-categories>
            <Category name="SciFi" priority=1 />
            <Category name="Romance" priority=2 />
        </sub-categories>
</Main categories>
```

The user template preferences XML file is used by the mosaic builder 260 to build the mosaic main menu 158 allowing the user to navigate through the list of channels available and organized in categories and sub-categories. The user set-top box 270 (FIG. 4) receives from the mosaic builder 260 all the required information to build the mosaic GUI 150 (FIG. 3).

The following embodiment of XML syntax (data representation) is used to represent the mosaic display 100 (FIG. 2) information:

```
<Mosaic>
    <main channel>
        <channel ID=BBC URL=igmp://xxx.yyy.zzz.vvv>
            <title ProgramID=1234>Breaking News</title>
            <info>textual infos</info>
            ......
        </channel>
    </main channel>
    <related channel>
        <channel ID=BBC2 URL=igmp://xxx.yyy.zzz.vvv>
            <title ProgramID=4321>Evening News</title>
            <Thumbnail>http://xxx.yyy.zzz.vvv/channel?BBC2<thumbnail>
            <info>additional textual info</info>
            ......
        </channel>
        <channel ID=VOD-A URL=rtsp://xxx.yyy.zzz.vvv/movieA>
            <title>The movie</title>
            <Thumbnail>http://xxx.yyy.zzz.vvv/movieA.jpg<thumbnail>
            <info>this movie talk about...</info>
            ......
        </channel>
    </related channel>
</Mosaic>
```

Another component in the system 200 is a thumbnail TV-Generator 240 which is used when the user set-top box is not able to decode several IPTV video streams simultaneously (for example, unicast or multicast based). The thumbnail TV-Generator is dynamically invoked to generate screenshots of the requested live TV channel, the resulting image is then used to fulfill the video elements 162 of the mosaic. Based on a timeout parameter, a request is sent by the IPTV middleware application 290 (FIG. 4) to refresh the screenshot of a video element channel thumbnail to produce an animated image placed into the video element of the mosaic 162 (FIG. 3).

For each TV Channel or video asset 162 available as a related video element to the main channel 154 (FIG. 3) the metadata aggregator 250 maintains a table, for example, as follows:

TABLE

| Channel ID | Program ID | Keywords | Category hierarchy |
|---|---|---|---|
| BBC | 1234 | News, Breaking news, irak, Pakistan, . . . | News/international/national/UK |
| VOD-A | xxx | Movie, action, | Movie/SciFi/2007 |

In the table, the channel ID identifies the channel or video asset. The program ID uniquely identifies the program itself and allows retrieval of contextual information from external sources like EPG providers. The keywords are a collection of keywords associated with the program and are used to retrieve similarities with the main video. The category hierarchy is used to organize channels and programs into hierarchy trees facilitating the user selection.

Figure 1:
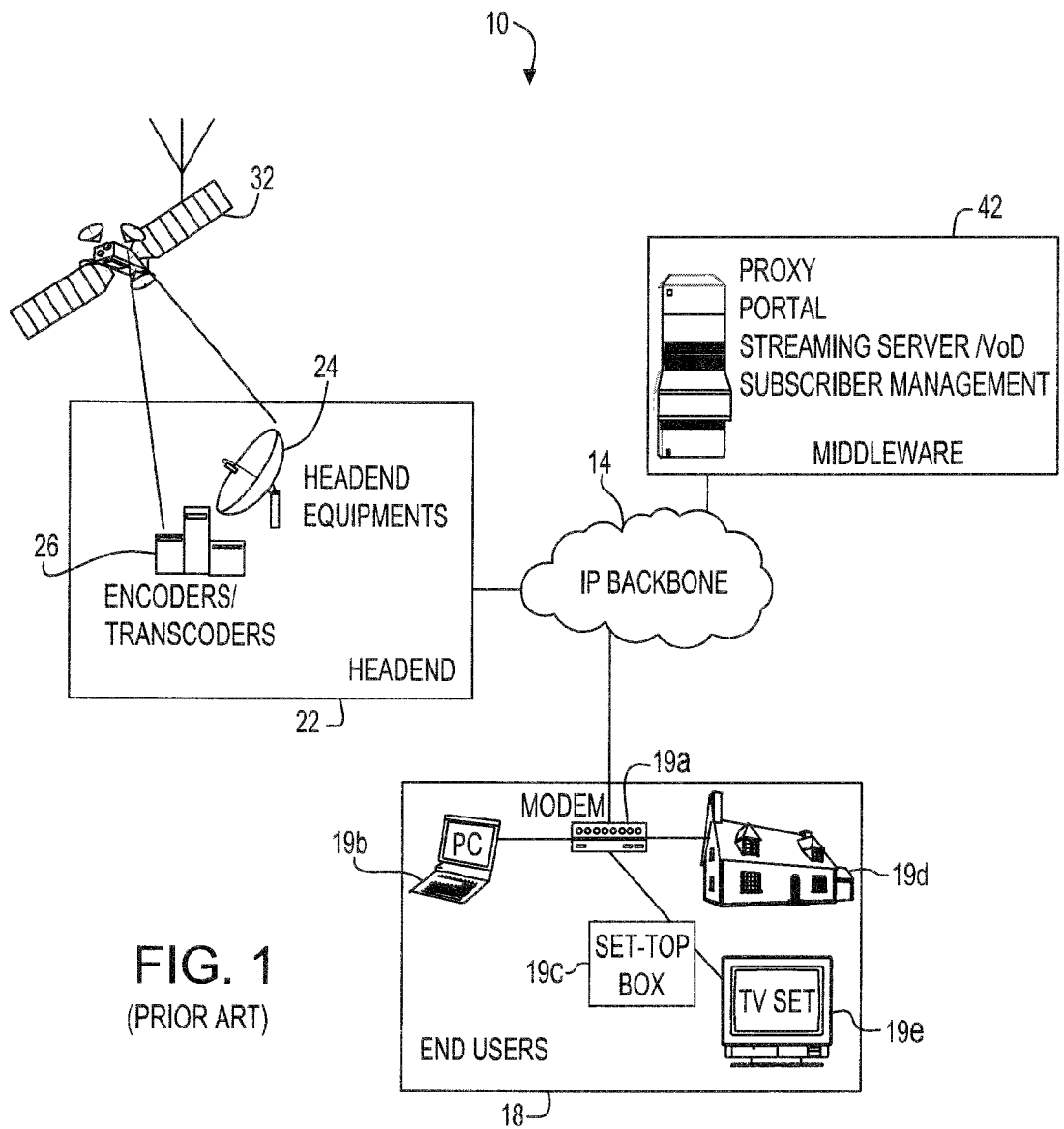
FIG. 1 is a perspective view illustrating a prior art communications system.
Figure 5:
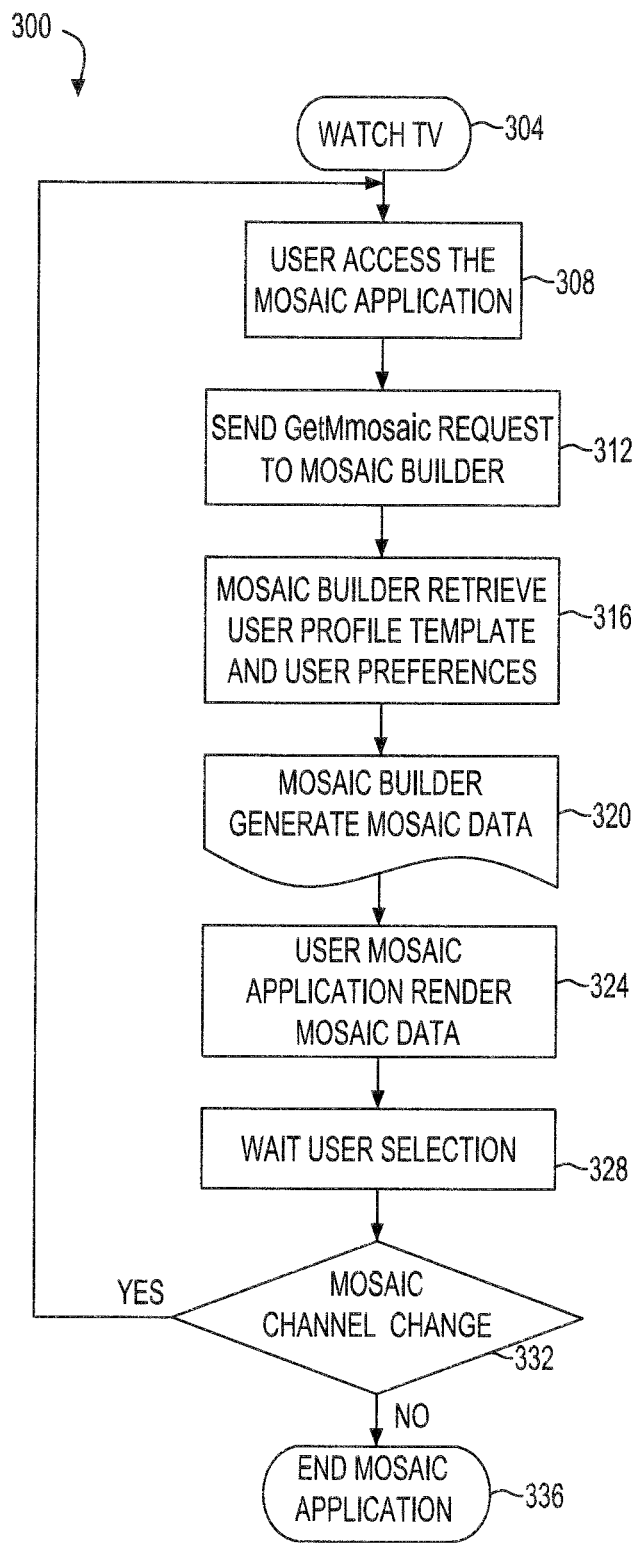
FIG. 5 is a flow chart of an embodiment of the present invention employing the system shown in FIG. 4.
Figure 6:
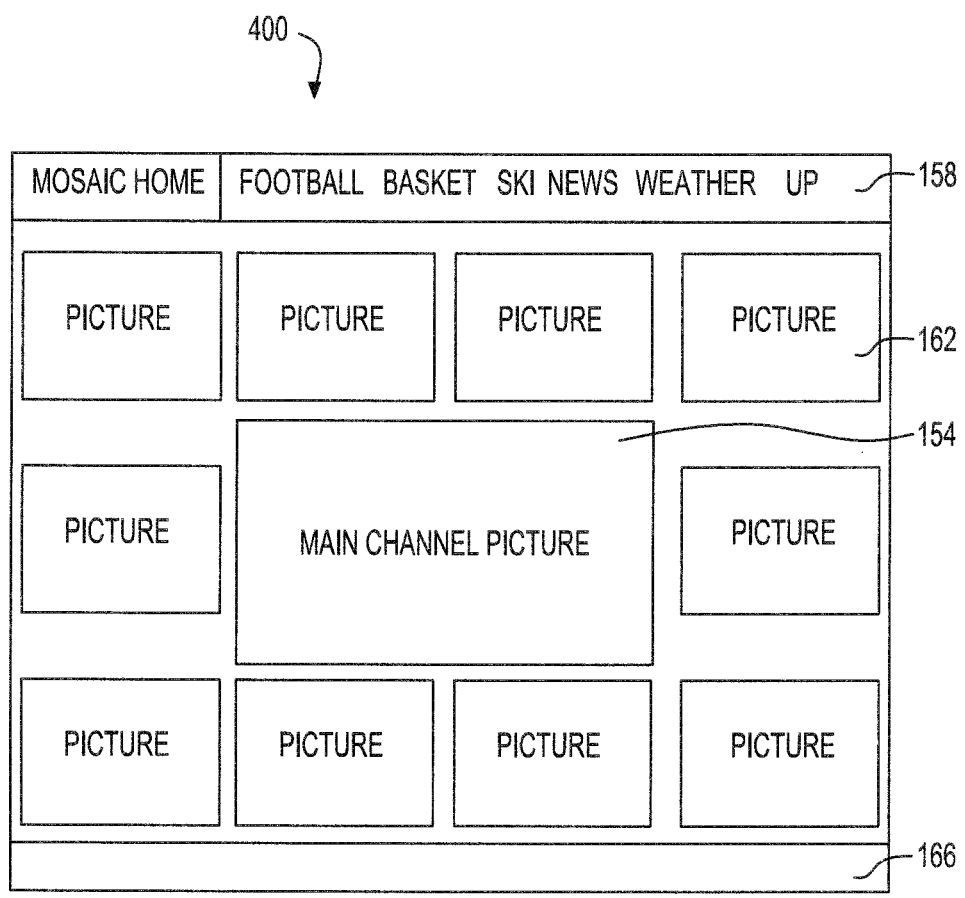
FIG. 6 is the embodiment of the mosaic shown in FIG. 3 with a title menu and exemplary pictures in the mosaic.

Referring to FIGS. 4 and 5, a flowchart 300 according to an embodiment of the invention illustrates the logic (e.g., a computer program) as an embodiment of the mosaic application 294 (FIG. 4) used to generate the mosaic GUI 150 (FIG. 3) and a sample mosaic GUI 400 in FIG. 6. An IPTV user watches regular TV channels, step 304, the user can access the mosaic application 294 in step 308 by selecting a dedicated button of its remote control or any other device able to send command to the set-top box 19b (FIG. 1). Accessing the mosaic application 294 (FIG. 4) starts with a request, in step 312, sent to an HTTP network (for example, wireless IP transmission) from the mosaic builder 260 (FIG. 4) using the GetMosaic method (described above) with the user ID and the current channel ID parameter filled. If the user selection came from the main menu, then only the category, sub-category parameter and the user ID parameter are used.

In step 316, the mosaic builder 260 (FIG. 4) retrieves the user profile with all its preferences, e.g., the user's center of interest, favorite channels, etc. The mosaic builder 260 (FIG. 4) builds a search request to the metadata aggregator 250 which retrieves all the live and non live video assets filling the search request ordered by similarity importance. In step 320, the mosaic builder 260 uses the search report to create the XML syntax data (described above) response to the mosaic application 294 (FIG. 4). In step 324, the mosaic application 294 used this XML response to build the GUI interface of the mosaic application. If the thumbnail TV generator 240 (FIG. 4) is used, the mosaic application 294 starts a timer for a specified time period, for example a specified number of milliseconds, for each video element 162 (FIG. 3) of a mosaic GUI 400 (FIG. 6), in step 328. The mosaic GUI 400 is an example of a mosaic display wherein like elements have the same reference numerals as the GUI interface shown in FIG. 3. When a timeout occurs a request is sent to the thumbnail TV generator 240 component to retrieve a new thumbnail image of the live channel to be displayed inside the mosaic GUI 400 (FIG. 6). Then, the timer is restarted for the specified time period. In step 332, the application 294 waits for the user to change the channel, and if the channel is changed the program returns to before step 308 to re-generate the mosaic GUI 400 (FIG. 6) as shown in FIG. 6.

Therefore, an advantage of the present invention is the dynamic mosaic dynamically proposing channels related to the main channel being viewed by the user. A further advantage of the present invention is the ability for the user to select the number of TV channels to add, and thereby view simultaneously, to the dynamic mosaic.

While the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

What is claimed is:

1. A method of building an interactive display related to TV programs in an internet protocol television (IPTV) environment using a computer having a program embodied on a non-transitory computer readable medium being executed by a processor of the computer, comprising:

parsing a plurality of TV programs provided in an IPTV environment for display to a user, the step of parsing providing metadata based on the TV programs, wherein the step of parsing includes:
capturing an image in each TV program;
identifying video content in each captured image wherein the video content comprises at least one object;
interpreting the video content for each captured image;
capturing audio data for each of the TV programs;
identifying an audio content in each captured audio data wherein the audio content comprises text and/or sound; and interpreting the audio content for each captured audio data,
wherein the interpreting the video content and the interpreting the audio content including: decoding data streams of the each TV program simultaneously;
if the video content and the audio content cannot be interpreted,
generating screenshots of the each TV program;
refreshing the generated screenshots according to a time parameter;
generating, based on the refreshed screenshots, an animated image;
placing the animated image into one of the TV programs;
identifying a currently selected TV program by the user which is currently being displayed;
determining a correlation level using predefined rules between the interpreted video and audio content of the selected TV program and the interpreted video and audio content of each of a plurality of other TV programs using the metadata;
determining TV programs other than the selected TV program using the correlation level of the TV programs using the metadata;
organizing the selected TV program and the plurality of other TV programs according to a plurality of main categories, each main category having a corresponding priority, each main category having one or more sub-categories, each sub-category having a corresponding priority; and
building and presenting, according to the organizing, a mosaic display on a TV display with the selected TV program and the plurality of other TV programs.

2. The method of claim 1, wherein the steps are repeated and/or the method further includes a first step of:
requesting the subsequent steps by a user.

3. The method of claim 1, wherein the display is a mosaic having a plurality of interactive areas.

4. The method of claim 3, further including:
selecting the interactive areas using a head end device which provides a plurality of TV programs in an IPTV environment.

5. The method of claim 1, wherein the mosaic display is a dynamic mosaic display, and the method of claim 1 further comprising:
presenting the selected TV program as a main TV channel which is a current channel selected by the user on the dynamic mosaic display;
aggregating the plurality of other TV programs as other channels on the dynamic mosaic and the other channels being related to one or more attributes of the main TV channel; and
dynamically rebuilding the dynamic mosaic based on a new main TV channel selected by the user.

6. The method of claim 5, wherein the determined TV programs other than the selected TV program using the correlation level of the TV programs includes a live TV broadcast, said method further comprising:
retrieving, by a metadata aggregator, said live broadcast video asset and non-live video asset for display as a screenshot on said dynamic mosaic;
commencing a timer for a pre-determined time period, said timer specified for each live broadcast video asset screenshot displayed on said mosaic GUI; and
detecting occurrence of a timeout of said timer associated with a displayed live broadcast video asset;
sending, responsive to said detected timeout, a request to retrieve a new updated screenshot of the live channel to be displayed on the mosaic GUI;
re-freshing the timed out live broadcast video asset screenshot on the mosaic GUI with the new updated of the screenshot of the live channel to be displayed; and
re-starting the timer for the pre-determined time period associated with the new updated screenshot.

7. A system for building an interactive display related to TV programs in an internet protocol television (IPTV) environment, comprising:
a computer having a computer program stored on a computer readable medium for parsing a plurality of TV programs provided in an IPTV environment for display to a user, the parsing providing metadata based on the TV programs;
a metadata aggregator for capturing an image in each TV program, the meta data aggregator: identifies video content in each captured image wherein the video content comprises at least one object, interprets the video content for each captured image, captures audio data for each of the TV programs, identifies an audio content in each captured audio data wherein the audio content comprises text and/or sound, and interprets the audio content for each captured audio data,
wherein the interpret the video content and the interpret the audio content including: decoding data streams of the each TV program simultaneously;
if the video content and the audio content cannot be interpreted,
generating screenshots of the each TV program;
refreshing the generated screenshots according to a time parameter;
generating, based on the refreshed screenshots, an animated image;
placing the animated image into one of the TV programs;
the computer program further identifies a currently selected TV program by the user which is currently being displayed, and determines a correlation level using predefined rules between the interpreted video and audio content of the selected TV program and the interpreted video and audio content of each of a plurality of other TV programs, and determines TV programs other than the selected TV program using the correlation level of the TV programs, based on the metadata;
a mosaic builder electrically communicates with a TV of the user and the metadata aggregator and organizing the selected TV program and the plurality of other TV programs according to a plurality of main categories, each main category having a corresponding priority, each main category having one or more sub-categories, each sub-category having a corresponding priority; and
a TV display of the user's TV presenting, according to the organizing, a mosaic display using the mosaic builder, the mosaic display including the selected TV program and the plurality of other TV programs.

8. The system of claim 7, wherein the display is a mosaic having a plurality of interactive areas.

9. The system of claim 8, further including:
a head end device providing selection of the interactive areas which provides a plurality of TV programs in an IPTV environment.

10. The system of claim 7, wherein metadata is gathered from a TV channel provider using an electronic program guide.

11. The system of claim 7, further including:
a thumbnail generator for decoding several IPTV video streams simultaneously.

12. The system of claim 7, wherein metadata for non live TV channels is generated from video demand catalogs and/or other video server providers and used by the metadata aggregator.

13. The system of claim 7, wherein the mosaic display is a dynamic mosaic display, said mosaic builder presenting the selected TV program as a main TV channel which is a current channel selected by the user on the dynamic mosaic display, aggregating the plurality of other TV programs as other channels on the dynamic mosaic and the other channels being related to one or more attributes of the main TV channel; and dynamically rebuilding the dynamic mosaic based on a new main TV channel selected by the user.

14. The system of claim 13, wherein the determined TV programs other than the selected TV program using the correlation level of the TV programs includes a live TV broadcast, said system further comprising:
said metadata aggregator retrieving a live broadcast video asset and non-live video asset for display as a screenshot on said dynamic mosaic;
a timer element associated with each live broadcast video asset screenshot displayed on said mosaic GUI, each said timer element specified for a pre-determined time period;
said mosaic builder detecting occurrence of a timeout of said timer associated with a displayed live broadcast video asset, and sending, responsive to said detected timeout, a request to said metadata aggregator to retrieve a new updated screenshot of the live channel to be displayed on the mosaic GUI;
said mosaic builder re-freshing the timed out live broadcast video asset screenshot on the mosaic GUI with the new updated of the screenshot of the live channel to be displayed; and
re-starting the timer for the pre-determined time period associated with the new updated screenshot.

15. The system according to claim 7, wherein the mosaic builder performs building a search request in order to retrieve live and non live video assets, using a search result in order to create an XML syntax data, and building, based on the XML syntax data, the mosaic display.

16. A computer program product comprising a non-transitory computer readable medium having recorded thereon a computer program for enabling a processor in a computer system to build an interactive display related to TV programs in an internet protocol television environment, the computer program performing the steps of:
parsing a plurality of TV programs provided in an IPTV environment for display to a user, the step of parsing providing metadata based on the TV programs, wherein the step of parsing includes:
capturing an image in each TV program;
identifying video content in each captured image wherein the video content comprises at least one object;
interpreting the video content for each captured image;
capturing audio data for each of the TV programs;
identifying an audio content in each captured audio data wherein the audio content comprises text and/or sound; and
interpreting the audio content for each captured audio data,
wherein the interpreting the video content and the interpreting the audio content including: decoding data streams of the each TV program simultaneously;
if the video content and the audio content cannot be interpreted,
generating screenshots of the each TV program;
refreshing the generated screenshots according to a time parameter;
generating, based on the refreshed screenshots, an animated image;
placing the animated image into one of the TV programs;
identifying a currently selected TV program by the user which is currently being displayed;
determining a correlation level using predefined rules between the interpreted video and audio content of the selected TV program and the interpreted video and audio content of each of a plurality of other TV programs, using the metadata;
determining TV programs other than the selected TV program using the correlation level of the TV programs, using the metadata; and
organizing the selected TV program and the plurality of other TV programs according to a plurality of main categories, each main category having a corresponding priority, each main category having one or more sub-categories, each sub-category having a corresponding priority; and
building and presenting, according to the organizing, a mosaic display on a TV display with the selected TV program and the plurality of other TV programs.

17. The computer program product of claim 16, wherein the steps are repeated and/or the program further includes a first step of:
requesting the subsequent steps by a user.

18. The computer program product of claim 16, wherein the display is a mosaic having a plurality of interactive areas.

19. The computer program product of claim 16, further including the step of:
selecting the interactive areas using a head end device which provides a plurality of TV programs in an IPTV environment.

20. The computer program product of claim 16, wherein the mosaic display is a dynamic mosaic display, said computer program performs further steps of: presenting the selected TV program as a main TV channel which is a current channel selected by the user on the dynamic mosaic display, aggregating the plurality of other TV programs as other channels on the dynamic mosaic and the other channels being related to one or more attributes of the main TV channel; and dynamically rebuilding the dynamic mosaic based on a new main TV channel selected by the user.

21. The computer program product of claim 20, wherein said determined TV programs other than the selected TV program using the correlation level of the TV programs includes a live TV broadcast, said computer program further performing:
retrieving, by a metadata aggregator, said live broadcast video asset and non-live video asset for display as a screenshot on said dynamic mosaic;
commencing a timer for a pre-determined time period, said timer specified for each live broadcast video asset screenshot displayed on said mosaic GUI; and
detecting occurrence of a timeout of said timer associated with a displayed live broadcast video asset;

sending, responsive to said detected timeout, a request to retrieve a new updated screenshot of the live channel to be displayed on the mosaic GUI;

re-freshing the timed out live broadcast video asset screenshot on the mosaic GUI with the new updated screenshot of the live channel to be displayed; and re-starting the timer for the pre-determined time period associated with the new updated screenshot.

\* \* \* \* \*